US008285542B2

(12) United States Patent
Yu et al.

(10) Patent No.: US 8,285,542 B2
(45) Date of Patent: Oct. 9, 2012

(54) ADAPTING A LANGUAGE MODEL TO ACCOMMODATE INPUTS NOT FOUND IN A DIRECTORY ASSISTANCE LISTING

(75) Inventors: Dong Yu, Kirkland, WA (US); Alejandro Acero, Bellevue, WA (US); Yun-Cheng Ju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/027,921

(22) Filed: Feb. 15, 2011

(65) Prior Publication Data

US 2011/0137639 A1 Jun. 9, 2011

Related U.S. Application Data

(62) Division of application No. 11/642,003, filed on Dec. 19, 2006, now Pat. No. 7,912,707.

(51) Int. Cl.
*G06F 17/21* (2006.01)

(52) U.S. Cl. ............... 704/10; 704/9; 704/231; 704/235; 704/251; 704/255; 704/257

(58) Field of Classification Search ................... 704/1, 9, 704/10, 231, 251, 257, 235, 255
See application file for complete search history.

(56) References Cited

U.S. PATENT DOCUMENTS

| | | | |
|---|---|---|---|
| 5,497,339 A | 3/1996 | Bernard | |
| 5,675,524 A | 10/1997 | Bernard | |
| 6,044,337 A | 3/2000 | Gorin et al. | |
| 6,167,398 A * | 12/2000 | Wyard et al. | ............ 1/1 |
| 6,286,060 B1 | 9/2001 | DiGiorgio et al. | |
| 6,446,127 B1 | 9/2002 | Schuster et al. | |
| 6,571,210 B2 | 5/2003 | Hon et al. | |
| 6,625,472 B1 | 9/2003 | Farazmandnia et al. | |
| 6,760,804 B1 | 7/2004 | Hunt et al. | |
| 6,839,671 B2 | 1/2005 | Attwater et al. | |
| 6,975,856 B2 | 12/2005 | Ogasawara | |
| 6,980,546 B2 | 12/2005 | Purpura et al. | |
| 7,177,597 B2 | 2/2007 | Jung et al. | |
| 7,912,503 B2 | 3/2011 | Chang et al. | |
| 7,912,707 B2 | 3/2011 | Yu et al. | |
| 2001/0034803 A1 | 10/2001 | Sorek et al. | |

(Continued)

FOREIGN PATENT DOCUMENTS

WO WO0209023 1/2002

(Continued)

OTHER PUBLICATIONS

Bostwick et al., "Innovative User Interfaces that use Mobile Devices at the Same time as PCs," http:www.teco.edu.chi2000ws/papers/31_myers.htm., Apr. 2000.

(Continued)

*Primary Examiner* — Qi Han
(74) *Attorney, Agent, or Firm* — Westman, Champlin & Kelly, P.A.

(57) ABSTRACT

A statistical language model is trained for use in a directory assistance system using the data in a directory assistance listing corpus. Calculations are made to determine how important words in the corpus are in distinguishing a listing from other listings, and how likely words are to be omitted or added by a user. The language model is trained using these calculations.

18 Claims, 6 Drawing Sheets

U.S. PATENT DOCUMENTS

| | | | |
|---|---|---|---|
| 2002/0103008 | A1 | 8/2002 | Rahn et al. |
| 2002/0118836 | A1 | 8/2002 | Howard et al. |
| 2003/0191625 | A1 | 10/2003 | Gorin et al. |
| 2004/0014423 | A1 | 1/2004 | Croome et al. |
| 2004/0097127 | A1 | 5/2004 | Smith et al. |
| 2004/0204074 | A1 | 10/2004 | Desai |
| 2005/0004799 | A1* | 1/2005 | Lyudovyk ............... 704/254 |
| 2005/0135393 | A1 | 6/2005 | Benco et al. |
| 2005/0171761 | A1 | 8/2005 | Ju et al. |
| 2005/0228657 | A1 | 10/2005 | Chou et al. |
| 2006/0119315 | A1 | 6/2006 | Sasaki et al. |
| 2006/0259942 | A1 | 11/2006 | Toyama et al. |
| 2007/0005840 | A1 | 1/2007 | Cheng et al. |
| 2007/0021148 | A1 | 1/2007 | Mahini |
| 2007/0038785 | A1 | 2/2007 | Varanda et al. |
| 2007/0130592 | A1 | 6/2007 | Haeusel |
| 2007/0136264 | A1 | 6/2007 | Tran |
| 2008/0091443 | A1* | 4/2008 | Strope et al. ............... 705/1 |
| 2008/0147400 | A1 | 6/2008 | Yu et al. |
| 2009/0023395 | A1 | 1/2009 | Chang et al. |
| 2009/0023475 | A1 | 1/2009 | Chang et al. |
| 2011/0136541 | A1 | 6/2011 | Chang et al. |
| 2011/0137639 | A1 | 6/2011 | Yu et al. |

FOREIGN PATENT DOCUMENTS

| | | |
|---|---|---|
| WO | WO03065227 | 8/2003 |

OTHER PUBLICATIONS

Bennani, "Integrating a Digital Camera in the Home Environment: Architecture and Prototype," vol. 4, No. 1, 2001, Tamkang Journal of Science and Engineering.

Jose, "Cypress Introduces Media Transfer Protocol 'Data Pipe' for Protected Content on Next Generation P\ortable Media Players," Jul. 6, 2004, Cypress Semiconductor Corp.

International Search Report and Written Opinion for PCT/US2008/070231, dated Jan. 29, 2009.

International Search Report and Written Opinion for PCT/US2008/070237, dated Jan. 29, 2009.

Prosecution Documents for U.S. Appl. No. 11/642,003 (42 total pages).

Original claims for U.S. Appl. No. 11/642,003 filed Dec. 19, 2006, 6 pages.

Restriction Requirement for U.S. Appl. No. 11/642,003, dated May 27, 2010, 6 pages.

Response to Restriction Requirement for U.S. Appl. No. 11/642,003, submitted Jun. 25, 2010, 1 page.

Office Action for U.S. Appl. No. 11/642,003, dated Jul. 14, 2010, 6 pages.

Interview Summary for U.S. Appl. No. 11/642,003, dated Sep. 7, 2010, 3 pages.

Interview Summary (Response) for U.S. Appl. No. 11/642,003, submitted Oct. 7, 2010, 2 pages.

Amendment for U.S. Appl. No. 11/642,003, submitted Oct. 14, 2010, 10 pages.

Notice of Allowance and Notice of Allowability for U.S. Appl. No. 11/642,003, dated Nov. 16, 2010, 8 pages.

Mentor Graphics Corporation, "Nucleus Supports Microsoft Media's Transfer Protocol for Digital Devices", Place of Publication: http://www.embeddedstar.com/press/content/2006/2/embedded19515.html, Feb. 8, 2006, 3 pages.

* cited by examiner

ADAPTING A LANGUAGE MODEL TO ACCOMMODATE INPUTS NOT FOUND IN A DIRECTORY ASSISTANCE LISTING

CROSS-REFERENCE TO RELATED APPLICATION

The present application is a divisional of and claims priority to U.S. patent application Ser. No. 11/642,003, filed Dec. 19, 2006, the content of which is hereby incorporated by reference in its entirety.

BACKGROUND

Directory assistance services are typically services through which users are assisted in finding telephone numbers (or other information) for business or residential listings. In recent years, automatic speech recognition systems have been deployed in directory assistance services. In such systems, it is intended that a user of the directory assistance service simply speak a listing, and the words spoken by the user will be recognized by the automatic speech recognition system. They can then be compared against a set of listings to identify the listing sought by the user. The information associated with that listing can then be provided to the user.

Of course, one of the most important tasks in the automatic directory assistance service is to predict how people will refer to a listing. Once that is done, it can help the automatic speech recognizer to recognize the user's input speech more accurately, and help the search component to search for the listings with better accuracy to obtain a telephone number (or other information) for the desired listing.

The ideal condition is to build a statistical language model (LM) for use in predicting a listing that the user has spoken by using manually transcribed actual call records. However, building a good quality LM requires a huge amount of training data while manual collection and transcription of domain specific speech data is very costly and time consuming, and most of the time, impossible, especially at the early stages of the system development.

Alternatively, predicting how users are going to refer to a given listing has been done in some current systems by employing humans to manually listen to actual recordings of users using the directory assistance services and then manually authoring rules that reflect what the users have said, hoping that the rules can be generalized to unseen listings as well. This can be very costly and time consuming, and usually has low coverage or over generalization. There are more than 18 million business listings in the United States alone. Therefore, any system that relies on manually written rules cannot easily scale up.

Therefore, still other systems build a statistical language model using only the data from the actual directory listings (e.g., using only the actual business names and residential names as they appear in the directory assistance listing). This is even more problematic. It is known that approximately 56 percent of users, when using directory assistance, do not recite the actual listed names. Instead, the user often omits words, or substitutes different words for those in the actual listing. As a result, a language model built based on the listed names alone performs poorly when the directory assistance system is actually deployed in a real world environment.

A few examples may be helpful. When using directory assistance to find a restaurant, a user may say "Kung Ho Restaurant", while the actual business listing in the directory assistance database is "Kung Ho Cuisine of China". If the language model is trained based only on the listed names in the actual directory assistance listing, the bi-gram P(Restaurant|Ho) is very low. Therefore, the automatic speech recognition system may favor another restaurant, such as "Kung Kung Restaurant" if "Kung Kung Restaurant" is in the actual business listing database. This is an instance in which the user substituted a word (Restaurant) corresponding to the category of the listing (the Kung Ho Cuisine of China restaurant would likely be listed under "Restaurants" in the directory assistance database) for an actual portion of the listing (Cuisine of China).

In another example, a user of directory assistance wishing to obtain a telephone number for "Microsoft Corporation" might simply say "Microsoft". However, the probability in a language model generated from the actual listings P(</s>|Microsoft) where </s> is the sentence end symbol, is very low. Therefore, the automatic speech recognition system may pick another listing, such as "Micro Song" as the output. This is a case in which the user has simply omitted one of the words in the actual listing (here the word is "Corporation").

The discussion above is merely provided for general background information and is not intended to be used as an aid in determining the scope of the claimed subject matter.

SUMMARY

A statistical language model is trained for use in a directory assistance system using the data in a directory assistance listing corpus. Calculations are made to determine how important words in the corpus are in distinguishing a listing from other listings, and how likely words are to be omitted or added by a user. The language model is trained using these calculations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
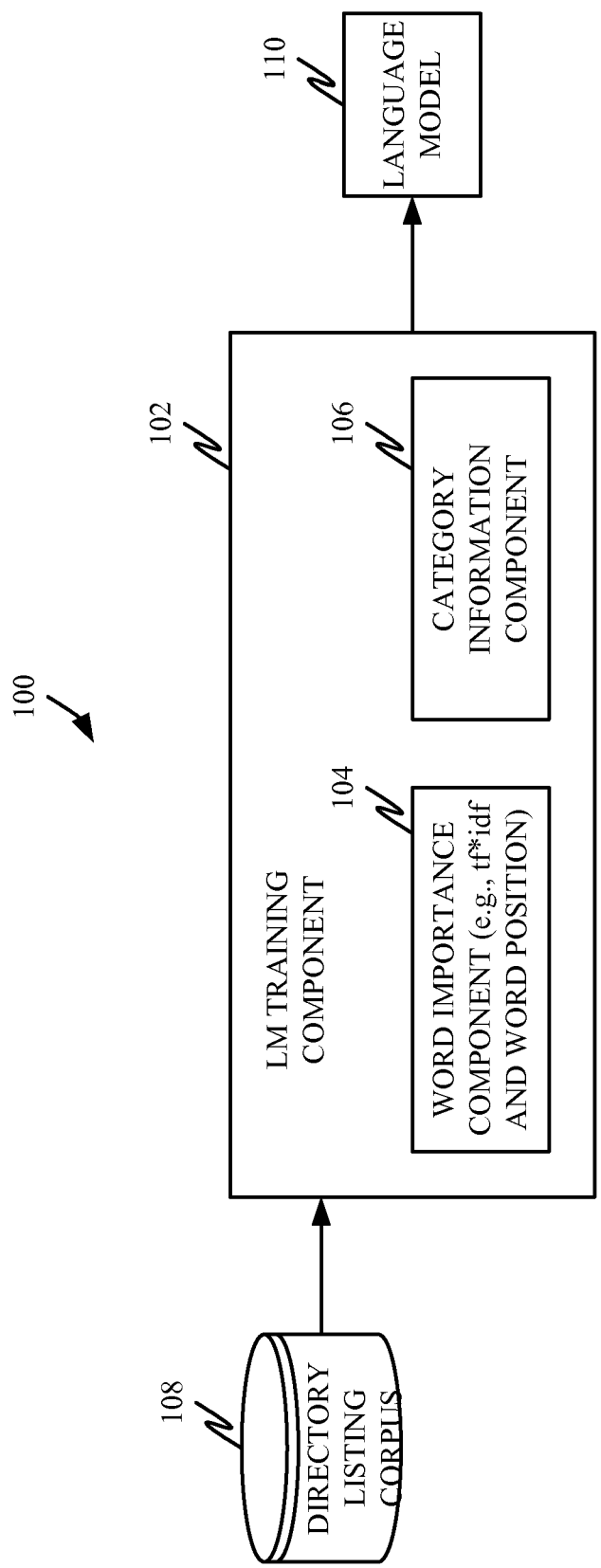
FIG. 1 is a block diagram of one illustrative model training system.

FIG. 1 is a block diagram of one illustrative language model training system 100. Training system 100 includes language model training component 102 that has word importance component 104, and category information component 106. Word importance component 104 determines the importance of a given word in a directory assistance listing in distinguishing that listing from other listings. Component 104 can also take into account the word position of the word within the listing. Category information component 106 calculates a measure of how important the word is in conveying category information about the category in which the listing resides.

FIG. 1 also shows language model training component 102 coupled to a directory listing corpus 108. Corpus 108 illustratively includes directory listings that can be used to train language model 110, which is, itself, output by language model training component 102.

Figures 2, 2A:
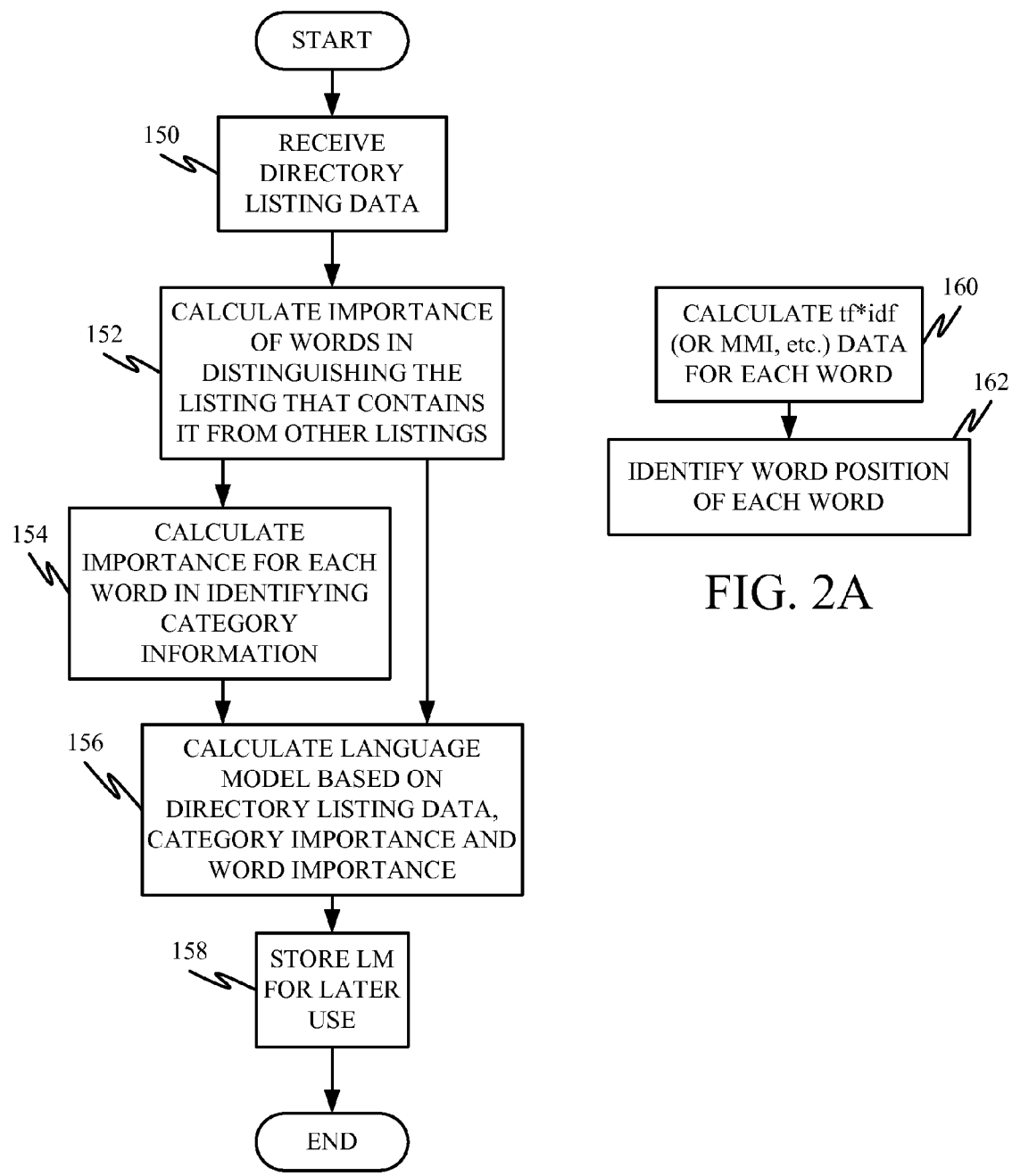
FIGS. 2 and 2A illustrate a flow diagram showing one illustrative embodiment of the operation of the system shown in FIG. 1.

FIG. 2 is a flow diagram illustrating one embodiment of the operation of system 100 shown in FIG. 1. FIGS. 1 and 2 will now be described in conjunction with one another.

It has been observed that users of directory assistance services often omit words that are not important in distinguishing a given listing from other listings in the directory assistance database. It has also been observed that users do not remember some words in given listings, usually those words at the end of a listed name. Similarly, it has been observed that users may add some words, that do not appear in the actual listing, that the user believes may help identify the listing. For instance, a user may often add category information when none appears in the actual listing. Using the example discussed in the background section, a user looking for the Chinese restaurant "Kung Ho Cuisine of China" may input "Kung Ho Restaurant". In that example, the user has actually omitted words that appear at the end of the listing and substituted, for those words, the category word "restaurant" which gives information about the category in which the listing resides.

Given these observations, language model 110 can be trained based on the importance of a given word in distinguishing the listing that contains it from other listings, based on the position of the word within the listing, and based on the importance of the word in providing category information.

In order to train language model 110 using data in directory listing corpus 108, language model training component 102 first receives or accesses the directory listing data in corpus 108. This is indicated by block 150 in FIG. 2. The directory listing data in corpus 108 illustratively includes the actual directory listings for which language model 110 is to be trained. The directory listings illustratively include the name of a business or resident along with associated information, such as a telephone number, email address, street address, etc., desired by the user. Of course, corpus 108 can include additional listings, or a subset of those listings, or even different listings, as well.

In any case, once the directory listing data has been received, word importance component 104 calculates the importance of each word in identifying the listing that contains it from other listings in the directory listing data. This is indicated by block 152 in FIG. 2 and is used in calculating the language model.

The categories may illustratively be thought of (as an example) as the various categories set out in yellow pages list directories. Those categories include such things as "Pizza", "Restaurant", "Metal Fabricators", "General Contractors", etc.

Category information component 106 calculates how important each word is for identifying category information in the given category in which it is contained. This is indicated by block 154 in FIG. 2. Calculation of the importance of words in each category and the importance of words for identifying category information is discussed in greater detail below.

Once these calculations are made, the language model 110 is calculated by language model training component 102. The language model is calculated not only based on the directory listing data in corpus 108, but also based on the word importance in identifying category information as calculated in block 154. Calculating the language model is indicated by block 156 in FIG. 2.

The language model 110, having been calculated, is then stored for later use in a runtime system. One embodiment of a runtime system is discussed below with respect to FIGS. 3 and 4. Storing the language model is indicated by block 158 in FIG. 2.

FIG. 2A is a flow diagram better illustrating the operation of word importance component 104. The more detailed operation of that component, and of component 106, will now be described.

It has been observed that users tend to forget or omit words that occur later in a directory assistance listing. Similarly, it has been observed that words that occur less frequently in the directory assistance listings are more helpful in distinguishing one listing from the others. Therefore, in one embodiment, component 104 uses word position in the listing, as well as a measure of the frequency of the word used in the listing, to determine importance.

In one embodiment, for each word in each category in the directory listing corpus 108, component 104 calculates term frequency-inverse document frequency (tf*idf) (or a similar measure, such as maximum mutual information (MMI)). Calculating this measure is indicated by block 160 in FIG. 2A. This measure is used in generating the counts used in the language model in block 156 in FIG. 2.

Similarly, component 104 identifies the word position of each word (in directory listing corpus 108) in its individual listing. This is indicated by block 162 in FIG. 2A. Both of these items are used in generating the counts used in calculating the language model, as indicated by block 156 in FIG. 2.

More specifically, assume that the words in a business listing/in corpus 108 are represented by $$w_i, i=0, \ldots, N+1 \qquad \text{Eq. 1}$$

where $w_0 = \langle s \rangle$ which indicates the sentence start symbol; and $w_{N+1} = \langle /s \rangle$ which indicates the sentence end symbol.

If users always spoke the exact listed name in the directory listing corpus 108, then the contribution of each word to the counts in the language model calculation would be:

$$C(w_{i+1}|w_i) += 1 (i=0, \ldots, N) \qquad \text{Eq. 2}$$

This simply means that for each word w to $w_N$, where the word $w_{i+1}$ occurs given its preceding word $w_i$, 1 is added to the count $C(w_{i+1}|w_i)$.

However, as discussed above, users most often do not in fact use the exact listings set out in directory listing corpus 108. Instead, users may omit words in the actual listing, add words to the actual listing, or change some words in the actual listing. Therefore, in one embodiment, the estimated contribution to the counts used in calculating the language model is given as follows:

$$C(w_{i+k}|w_i) += \begin{cases} P(\text{omit}(w_{i+1}, \ldots, w_{i+k-1})) & k > 1 \\ 1 - \sum_{d=2}^{N} P(\text{omit}(w_{i+1}, \ldots, w_{i+d-1})) & k = 1 \end{cases} \qquad \text{Eq. 3}$$

and $$C(w|w_i) += \beta \cdot P(\text{catof}(l)|w) \cdot (1 - P(\text{catof}(l)|w_i)) \qquad \text{Eq. 4}$$

where it can be seen that Eq. 3 adjusts the counts based on the probability that the user will omit the word, and Eq. 4 adjusts the count based on the probability that the user will replace or add a word identifying category information for the listing; and where the word w does not appear in the listing (i.e., $w \notin \{w_i\}$);

catof(l) means the category of the listing l; and

β is a constant that can be trained to minimize an overall distance between estimated language model probabilities and actual language model probabilities in training data if training data is available. In one embodiment, the distance is calculated using a known Kullback-Leibler (K-L) distance.

The probabilities set out in Equations 3 and 4 are further defined as follows:

$$P(catof(l) \mid w) = \frac{num(catof(l), w)}{\sum_{j=1}^{All} num(c_j, w)}, \quad \text{Eq. 5}$$

$$P(omit(w)) = a\left(1 - \frac{tfidf(w) \cdot \gamma^{pos(w)}}{\max_{i=1,\ldots,N} tfidf(w_i) \cdot \gamma^{pos(w_i)}}\right). \quad \text{Eq. 6}$$

where Eq. 5 defines the probability of a category of the listing l given a word w spoken by the user;

Eq. 6 defines the probability that a word in the listing will be omitted by the user;

$num(c_j, w)$ defines the number of times the word w occurs in the category $c_j$;

tfidf(w) defines the term frequency-inverse document frequency score of the word w, given all of the words in each category of the directory listing corpus 108 (i.e., the tfidf score is calculated for each word in each category in the corpus);

pos(w) is the 0-based position of the word w in the listing l; and

α and γ are, like β, illustratively trained to minimize the overall K-L distance (or other distance) between estimated language model probabilities and the true language model probabilities in the training data, if the training data is available. If no training data is available, all three of α, β, and γ can be set to one by default.

Figure 3:
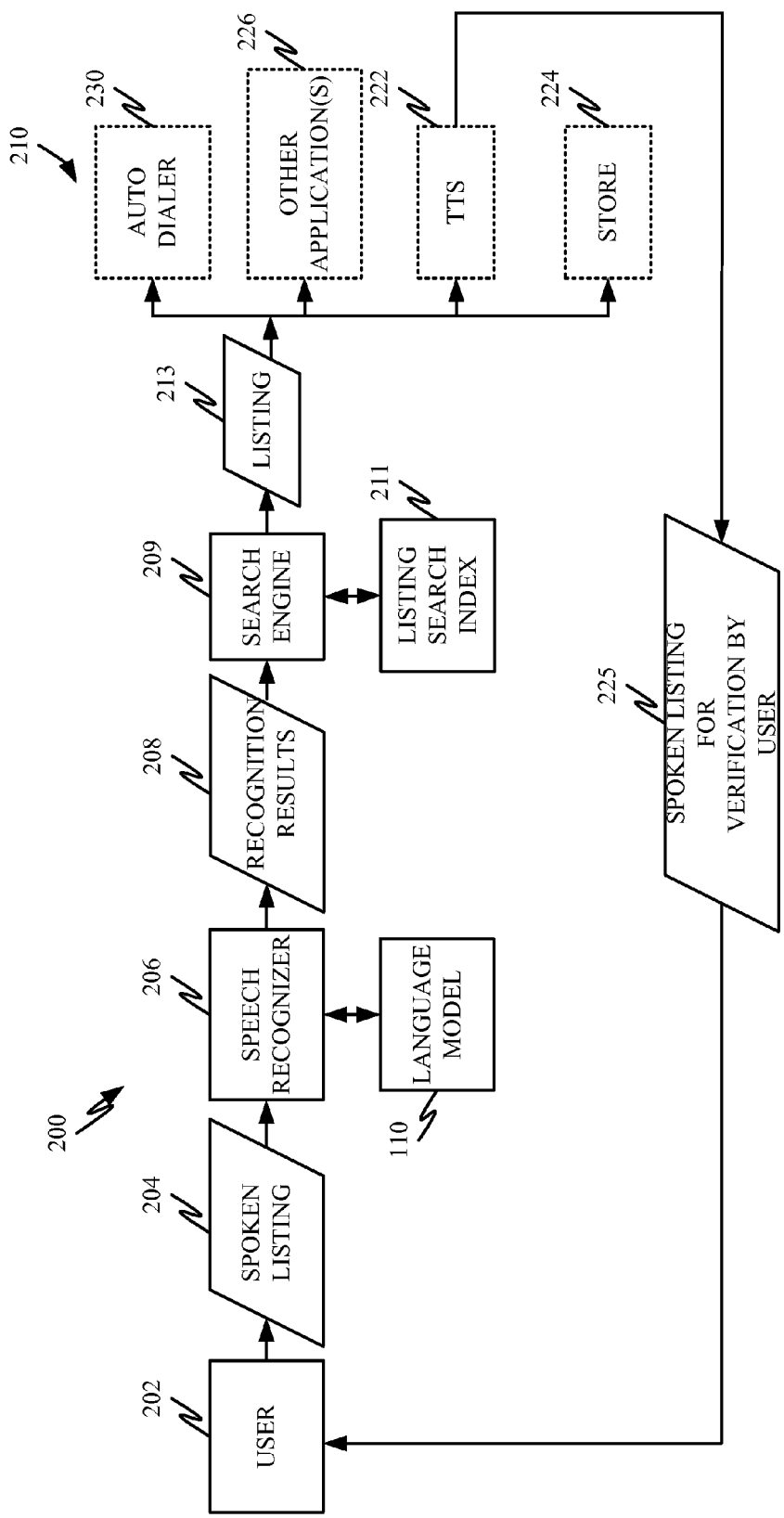
FIG. 3 is a block diagram of one illustrative runtime system.

Once the language model 110 is calculated, it can be stored and used in a runtime system. FIG. 3 is a block diagram of one illustrative runtime system 200. System 200 shows that a user 202 provides an input, such as a natural language input, in an attempt to receive information about a listing. The input can be spoken or typed or otherwise input. In this embodiment, the user speaks, through a telephone or other audio device (e.g., a microphone on a computer), a spoken listing 204 which is provided to a speech recognizer 206. In the embodiment shown in FIG. 3, speech recognizer 206 has access to language model 110 which was calculated as discussed above. The speech recognizer 206 outputs a result 208 that can be used by a search engine 209. Search engine 209 uses the recognition result 208 to search an index of listings 211 to identify listing 213 that can be used in one of a plurality of different applications 210.

Figure 4:
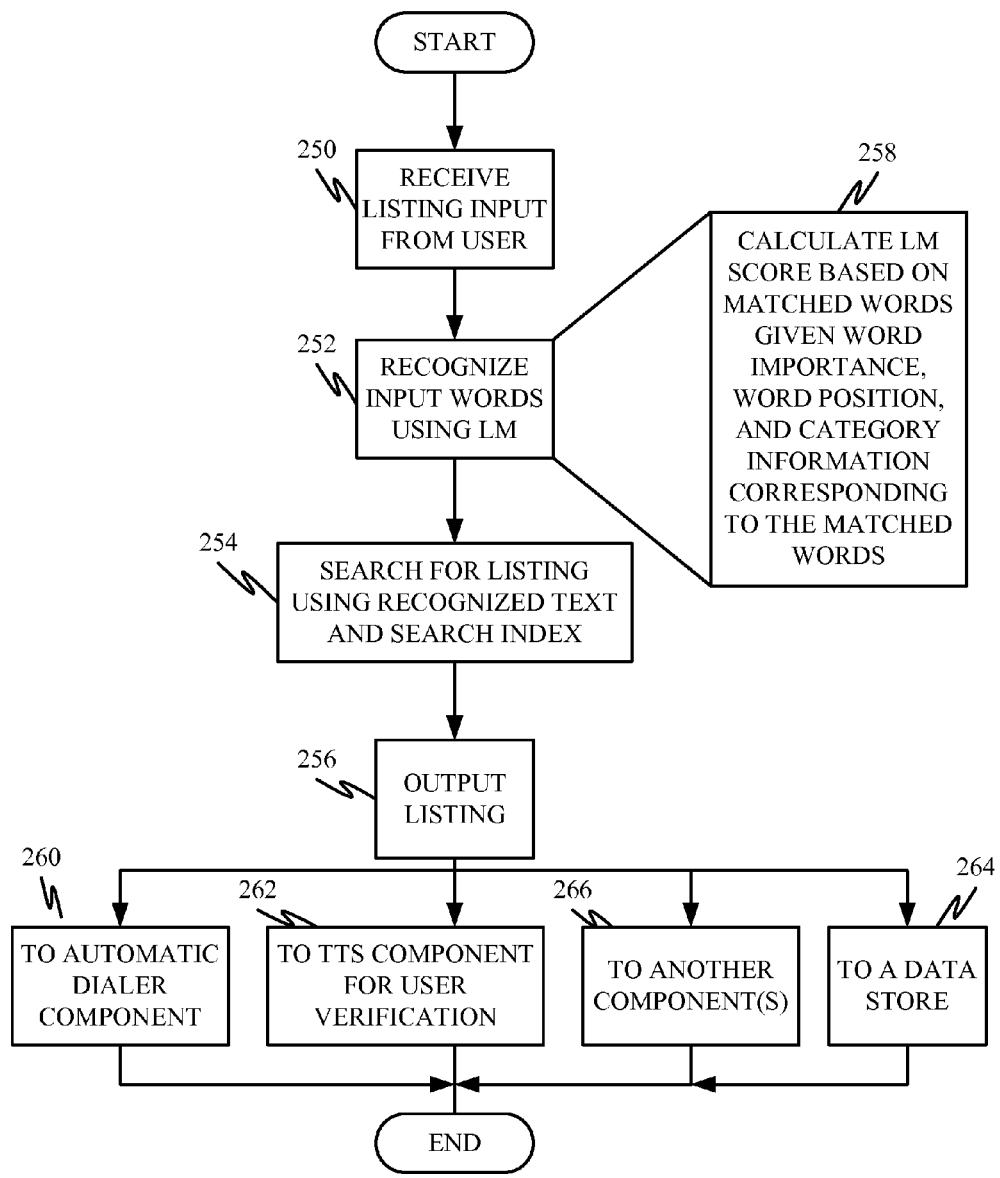
FIG. 4 is a flow diagram illustrating the operation of one embodiment of the runtime system shown in FIG. 3.

FIG. 4 is a more detailed flow diagram illustrating the overall operation of system 200 shown in FIG. 3. More specifically, then, speech recognizer 206 first receives the listing input 204 that is spoken by the user 202 over a telephone, through a microphone or using any other input mechanism. This is indicated by block 250 in FIG. 4. The spoken listing 204 is then recognized by speech recognizer 206. One embodiment of speech recognizer 206 is discussed below with respect to FIG. 5. In any case, the words in the spoken listing 204 are recognized.

In recognizing the words, speech recognizer 206 accesses language model 110 to identify words in a listing that the user is attempting to access in a directory assistance database. Accessing the language model to identify a listing and outputting that listing as recognition result 208, are indicated by block 252 in FIG. 4. FIG. 4 also illustrates that accessing the language model, in one embodiment, involves calculating a language model score based on the probabilities in language model 110. Of course, in one embodiment, the probabilities are estimated according to the counts that are adjusted based on word importance, word position, and whether the word identifies category information, for those words that are matched against words in the spoken listing 204. The counts can be adjusted by any of these individually or by any combination of them. This is indicated by block 258 in FIG. 4.

The whole goal of the directory assistance system 200 shown in FIG. 3 is to identify a directory listing that corresponds to the spoken listing 204 input by the user. Therefore, it is not so much important that speech recognizer 206 exactly transcribe the spoken listing 204 input by the user, but instead it is more important that speech recognizer 206 identify, through the use of language model 110 and search engine 209, the directory assistance listing that the speaker is looking for by inputting spoken listing 204 to system 200.

Therefore, based upon the words input by the user in spoken listing 204, and based upon the language model score calculated by language model 110, speech recognizer 206 outputs recognition result 208. Result 208 is provided to search engine 209. Search engine 209 uses result 208 to search listing index 211 to identify listing 213. Searching index 211 for the listing 213 is indicated by block 256 in FIG. 4.

Listing 213 illustratively corresponds to one of the listings in the directory assistance database. The directory assistance listing 213 can be used by directory assistance system 200 in a wide variety of ways. A number of different usage scenarios are shown in FIGS. 3 and 4. For instance, the directory assistance listing 213 will illustratively be associated with a telephone number (or other information). In that case, it can be output to an auto dialer application in which the number is automatically dialed, and that information is conveyed to user 202. The automatic dialer is shown in block 220 in FIG. 3 and outputting the listing 213 to an automatic dialer component is indicated by block 260 in FIG. 4.

FIG. 3 also shows that the directory assistance listing 213 can be output to a text-to-speech (TTS) component 222. TTS component 222 is illustratively a known TTS component that takes a textual input and converts it to an audible output which includes a spoken form of the listing 224. This can be done for a number of different reasons. For instance, system 200 may wish to provide the spoken listing 224 recognized by system 200 back to user 202 for verification. Similarly, system 200 may wish to provide the spoken listing 224 back to user 202 to give the user the opportunity to dial the number associated with the listing herself (or himself) before automatically dialing the number for the user. Providing the listing 213 to the text-to-speech component 222 is indicated by block 262 in FIG. 4.

System 200 may also wish to simply store the listing 213 in a data store 224, for further processing. This is indicated by block 264 in FIG. 4.

It will also, of course, be appreciated that listing 213 can be provided to a wide number of different applications 226. For instance, the listing 213 may be provided to an electronic mail application, or an instant messenger application, so that the listing recognized by system 200 is sent to user 202 using electronic mail or instant messaging. Of course, there are a wide variety of other applications which can use listing 213 as well. Outputting listing 213 to one or more other components or applications 226 is indicated by block 266 in FIG. 4.

Figure 5:
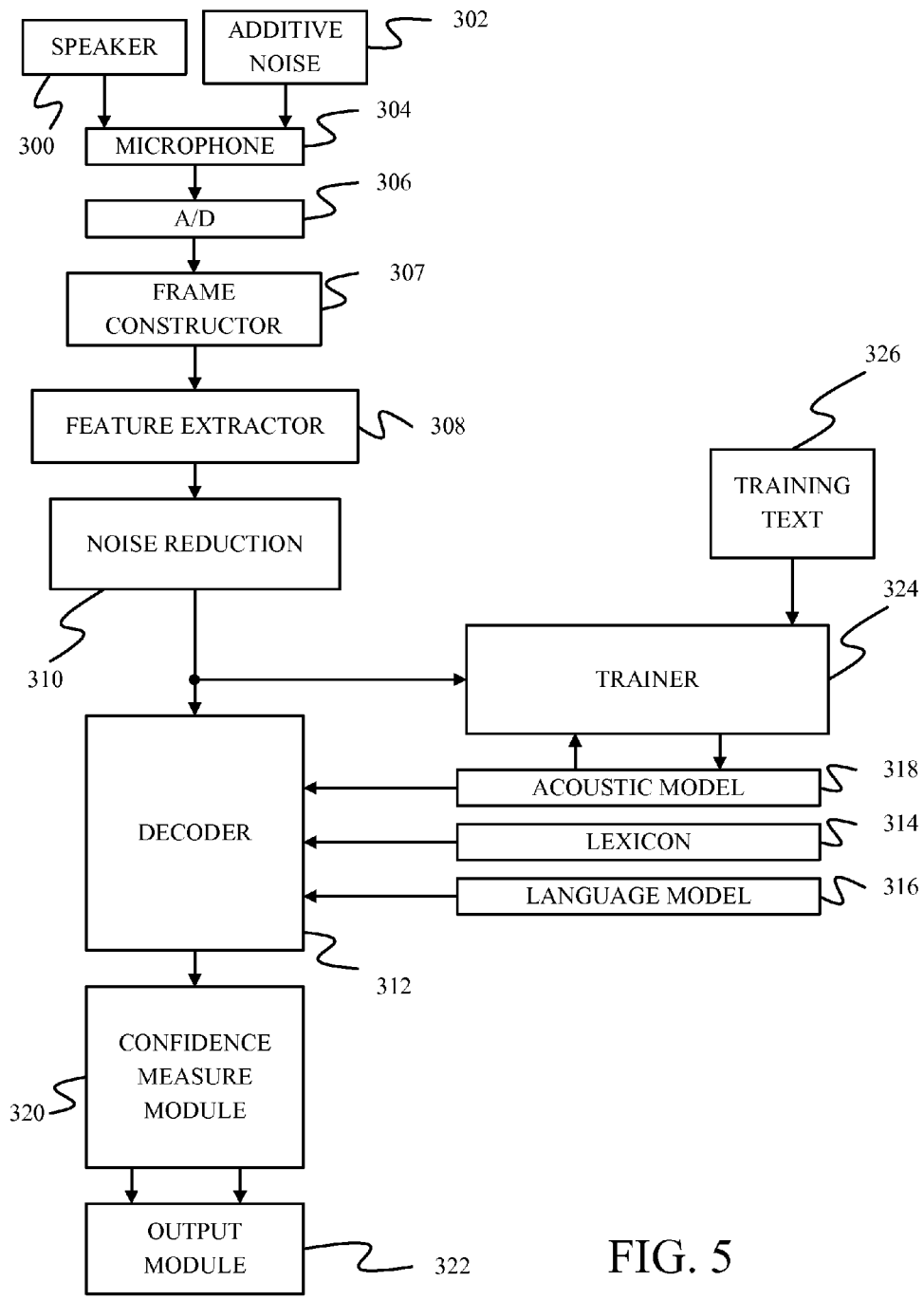
FIG. 5 is a block diagram of one illustrative speech recognition system.

FIG. 5 is a block diagram showing one illustrative embodiment of a speech recognizer 206 in more detail. It will be noted, of course, that a wide variety of different speech recognizers can be used and the one discussed with respect to FIG. 5 is shown for the sake of example only.

In FIG. 5, a speaker 300, either a trainer or a user, speaks into a microphone 304. Microphone 304 also receives additive noise from one or more noise sources 302. The audio signals detected by microphone 304 are converted into electrical signals that are provided to analog-to-digital converter 306.

A-to-D converter 306 converts the analog signal from microphone 304 into a series of digital values. In several embodiments, A-to-D converter 306 samples the analog signal at 16 kHz and 16 bits per sample, thereby creating 32 kilobytes of speech data per second. These digital values are provided to a frame constructor 307, which, in one embodiment, groups the values into 25 millisecond frames that start 10 milliseconds apart.

The frames of data created by frame constructor 307 are provided to feature extractor 308, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a stream of feature vectors that are each associated with a frame of the speech signal. This stream of feature vectors is provided to noise reduction module 310, which removes noise from the feature vectors.

The output of noise reduction module 310 is a series of "clean" feature vectors. If the input signal is a training signal, this series of "clean" feature vectors is provided to a trainer 324, which uses the "clean" feature vectors and a training text 326 to train an acoustic model 318. Techniques for training such models are known in the art and a description of them is not required for an understanding of the present invention.

If the input signal is a test signal, the "clean" feature vectors are provided to a decoder 312, which identifies a most likely sequence of words based on the stream of feature vectors, a lexicon 314, a language model 316 (which can be language model 110), and the acoustic model 318. The particular method used for decoding is not important to the present invention and any of several known methods for decoding may be used.

The most probable sequence of hypothesis words is provided to a confidence measure module 320. Confidence measure module 320 identifies which words are most likely to have been improperly identified by the speech recognizer, based in part on a secondary acoustic model (not shown). Confidence measure module 320 then provides the sequence of hypothesis words to an output module 322 along with identifiers indicating which words may have been improperly identified. Those skilled in the art will recognize that confidence measure module 320 is not necessary for the practice of the present invention.

Figure 6:
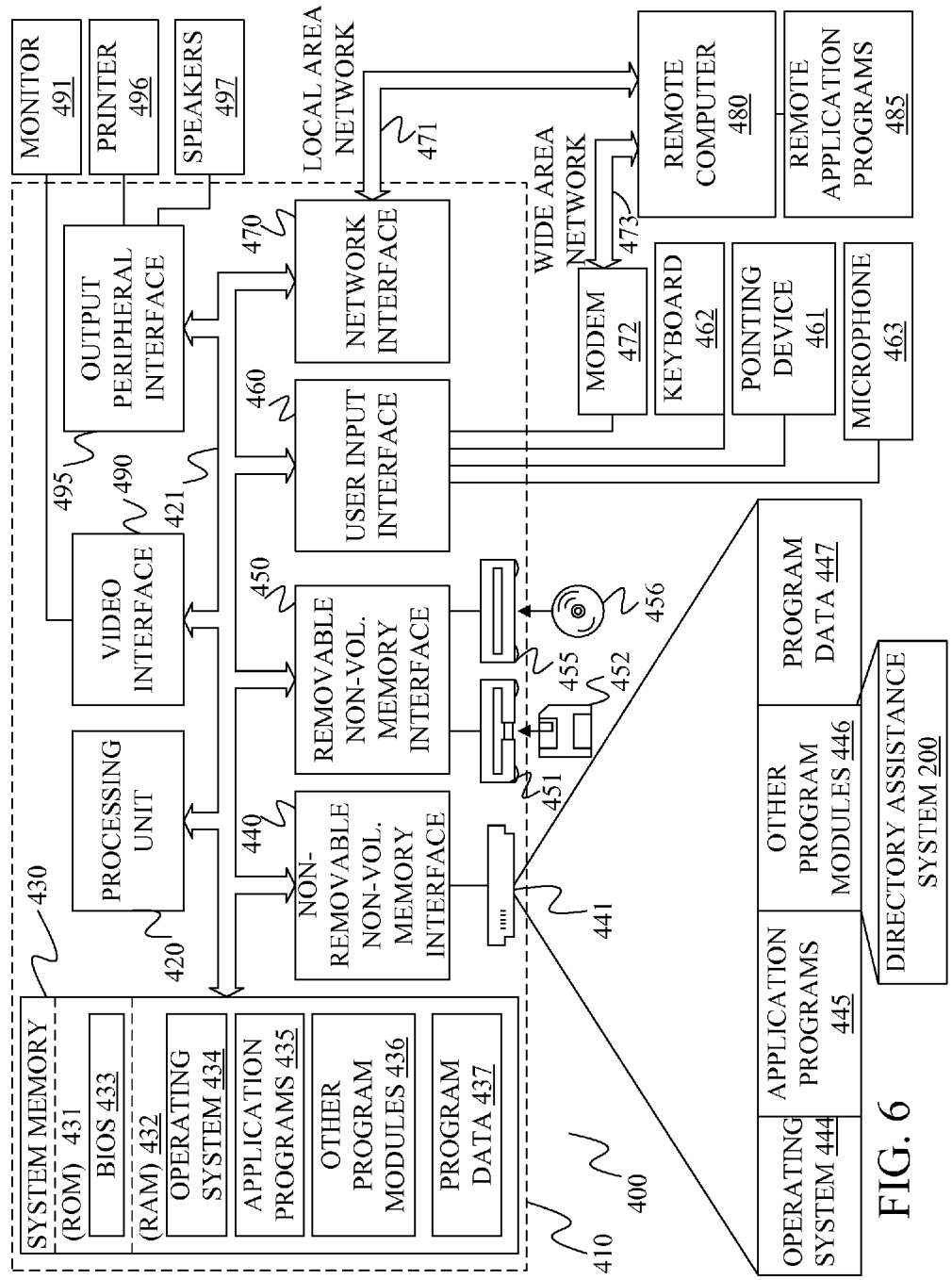
FIG. 6 is a block diagram of one illustrative computing environment.

FIG. 6 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 6, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 6 illustrates operating system 434, application programs 435, other program modules 436, and program data 437.

The computer 410 may also include other removable/non-removable volatile/nonvolatile computer storage media. By way of example only, FIG. 6 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 6, provide storage of computer readable instructions, data structures, program modules and other data for the computer 410. In FIG. 6, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. It can be seen that FIG. 6 shows directory assistance system 200 resides in other applications 446. Of course, it will be appreciated that system 200 can reside in other places as well, including in the remote computer, or at any other location that is desired.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 6 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 6 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating a language model from a corpus of directory assistance listings, the language model used to estimate a desired directory assistance listing based on a listing request input, the method comprising:

for each word in each listing in the corpus, generating, using a processing unit, language model counts attributable to the word by:
  determining, based on one or more characteristics of the word in the listing, whether the word is likely to be omitted from the listing request input when the desired directory assistance listing is a listing that contains the word;
  generating the language model counts attributable to the word based on whether the word is likely to be omitted from the listing request input when the desired directory assistance listing is a listing that contains the word; and
  generating the language model counts attributable to the word based on a characteristic indicative of how well the word operates to distinguish the listing that contains the word from other listings in the corpus; and
storing the language model with the language model counts.

2. The method of claim 1 wherein the corpus is divided into categories of directory assistance listings, and further comprising:
   generating the language model counts attributable to the word based on an indicator of whether the word is descriptive of the category to which the listing that contains the word belongs.

3. The method of claim 2 wherein generating the language model counts attributable to the word comprises:
   generating the language model counts attributable to the word based on whether the word is likely to be omitted, generating the language model counts attributable to the word based on a characteristic indicative of how well the word operates to distinguish the listing that contains the word from other listings in the corpus, and generating the language model counts attributable to the word based on an indicator of whether the word is descriptive of the category to which it belongs, separately for words in each category in the corpus.

4. The method of claim 3 wherein generating the language model counts attributable to the word based on whether the word is likely to be omitted comprises calculating a probability that the word will be omitted from the listing request input.

5. The method of claim 2, wherein each category has a textual label, and the method comprises:
   generating the language model counts attributable to the word based on whether the word is in the textual label for the category that contains the listing to which the word belongs.

6. The method of claim 1 wherein the one or more characteristics of the word in the listing comprises a word position of the word in the listing that contains the word.

7. The method of claim 1, wherein the corpus of directory assistance listings is divided into categories, and the one or more characteristics comprise an irrportance measure based on a frequency of occurrence of the word in the category to which the listing, that contains the word, belongs.

8. The method of claim 7, wherein the importance measure is calculated based on a term frequency-inverse document frequency value for the word in the category.

9. The method of claim 7, wherein the importance measure is calculated based on a maximum mutual information value for the word in the category.

10. A system for generating a language model used to estimate a desired directory assistance listing based on a listing request input, the system comprising:
    a processor:
    a corpus of directory assistance listings; and
    a language model generation component configured to:
      access the corpus of directory assistance listings;
      for each word in each listing in the corpus,
        determine, based on one or more characteristics of the word in the listing, whether the word is likely to be omitted from the listing request input when the desired directory assistance listing is a listing that contains the word;
        generate language model counts attributable to the word using the processor, wherein the language model counts are generated based on whether the word is likely to be omitted from the listing request input when the desired directory assistance listing is a listing that contains the word, and based on a characteristic indicative of how well the word operates to distinguish the listing that contains the word from other listings in the corpus; and
      store the language model with the language model counts.

11. The system of claim 10, wherein the corpus is divided into categories of directory assistance listings, and wherein the language model generation component is configured to generate the language model counts attributable to the word based on an indicator of whether the word is descriptive of the category to which the listing that contains the word belongs.

12. The system of claim 11, wherein the language model generation component is configured to generate, separately for words in each category in the corpus:
    the language model counts attributable to the word based on whether the word is likely to be omitted;
    the language model counts attributable to the word based on a characteristic indicative of how well the word operates to distinguish the listing that contains the word from other listings in the corpus; and
    the language model counts attributable to the word based on an indicator of whether the word is descriptive of the category to which it belongs.

13. The system of claim 12, wherein the language model generation component is configured to generate the language model counts attributable to the word based on whether the word is likely to be omitted comprises calculating a probability that the word will be omitted from the listing request input.

14. The system of claim 11, wherein each category has a textual label, and the language model generation component is configured to:
    generate the language model counts attributable to the word based on whether the word is in the textual label for the category that contains the listing to which the word belongs.

15. The system of claim 10, wherein the one or more characteristics of the word in the listing comprises a word position of the word in the listing that contains the word.

16. The system of claim 10, wherein the corpus of directory assistance listings is divided into categories, and the one or more characteristics comprise an importance measure based on a frequency of occurrence of the word in the category to which the listing, that contains the word, belongs.

17. The system of claim 16, wherein the importance measure is calculated based on a term frequency-inverse document frequency value for the word in the category.

18. The system of claim 16, wherein the importance measure is calculated based on a maximum mutual information value for the word in the category.

* * * * *